(12) United States Patent
Remillard (10) Patent No.: US 9,936,641 B2
(45) Date of Patent: Apr. 10, 2018

(54) TINE TUBE BUSHING FOR THE REEL OF A CROP HARVESTING HEADER

(71) Applicant: Macdon Industries Ltd., Winnipeg (CA)

(72) Inventor: Rheal Remillard, St. Joseph (CA)

(73) Assignee: MacDon Industries Ltd., Wpg MB (CA)

( * ) Notice: Subject to any disclaimer, the term of this patent is extended or adjusted under 35 U.S.C. 154(b) by 97 days.

(21) Appl. No.: 14/692,187

(22) Filed: Apr. 21, 2015

(65) Prior Publication Data

US 2016/0309652 A1    Oct. 27, 2016

(51) Int. Cl.
*A01D 57/02* (2006.01)
*A01D 41/14* (2006.01)

(52) U.S. Cl.
CPC ............ *A01D 57/02* (2013.01); *A01D 41/14* (2013.01)

(58) Field of Classification Search
CPC ........ A01D 57/00; A01D 57/02; A01D 57/03; A01D 57/08; A01D 57/12; A01D 43/077; A01D 43/082; A01D 41/08; A01D 41/10
USPC ......... 384/95, 273, 266, 275, 280, 281, 282, 384/301, 428
See application file for complete search history.

(56) References Cited

U.S. PATENT DOCUMENTS

| | | | | |
|---|---|---|---|---|
| 1,118,457 A | * | 11/1914 | Windish | F16C 9/04 384/281 |
| 2,694,894 A | * | 11/1954 | Linscheid | A01D 57/03 56/226 |
| 3,771,299 A | * | 11/1973 | Gradwohl | A01D 57/03 56/220 |
| 5,007,235 A | * | 4/1991 | Nickel | A01D 57/03 384/281 |
| 5,678,398 A | * | 10/1997 | Fox | A01D 57/02 56/226 |
| 6,199,358 B1 | * | 3/2001 | Majkrzak | A01D 57/02 56/220 |
| 6,324,823 B1 | * | 12/2001 | Remillard | A01D 57/02 56/220 |
| 6,591,598 B2 | * | 7/2003 | Remillard | A01D 57/03 56/221 |
| 7,856,801 B2 | * | 12/2010 | Remillard | A01D 57/02 56/220 |
| 2010/0281840 A1 | * | 11/2010 | Remillard | A01D 57/02 56/220 |
| 2014/0283494 A1 | * | 9/2014 | Schrattenecker | A01D 57/02 56/249 |

(Continued)

*Primary Examiner* — Alicia Torres
*Assistant Examiner* — Adam J Behrens
(74) *Attorney, Agent, or Firm* — Adrian D. Battison; Ade & Company Inc.; Ryan W. Dupuis (57) ABSTRACT

A crop harvesting header includes a cutter bar arranged across a forward edge of a header frame structure, a draper or auger transport arrangement for transporting the cut crop for further processing, and a reel with tines mounted on angularly spaced tine tubes each driven in a pivotal movement around its own bat axis as the reel rotates. The tine tubes are mounted on bearings where each bearing includes a cylindrical collar carried by support members on the reel and a cylindrical bearing member within the collar. The hollow tine tube has its peripheral wall punched to define an indented recess at each end of a transverse hole so that opposed projecting portions projecting on the bearing member are pulled into the recesses by a transverse fastener through the hole.

13 Claims, 5 Drawing Sheets

(56) References Cited

U.S. PATENT DOCUMENTS

2014/0325952 A1* 11/2014 Herringshaw ......... A01D 57/02
56/227
2017/0037896 A1* 2/2017 Jasper .................... A01D 57/12

* cited by examiner

FIG. 1

TINE TUBE BUSHING FOR THE REEL OF A CROP HARVESTING HEADER

This invention relates to a reel for a crop harvesting header comprising a reel for controlling movement of the crop in the area over the cutter bar where the reel has a plurality of reel bats at spaced positions around the reel axis with each reel bat having a tine tube and a plurality of tines mounted on the tine tube and projecting generally radially outwardly from an axis of the tine tube parallel to the reel axis and a plurality of tine tube support bearings each connecting a respective one of the tine tube support members to a respective one of the tine tubes.

BACKGROUND OF THE INVENTION

This invention relates to a crop harvesting header including a cutter bar and a reel for controlling movement of the crop in the area over the cutter bar. The reel is rotatable about an axis generally parallel to the cutter bar and has a plurality of reel bats each having reel tines projecting generally radially outwardly from the reel axis. The reel bats are pivotal each about a respective bat axis parallel to the reel axis so as to vary the angle of the tines about the bat axis as the reel rotates. Typically the reel co-operates with a cam carried on the header in generally stationary position so that each bat has a crank arm with a cam follower on the crank arm which follows the cam as the reel rotates and causes the required pivotal movement of the bat. An example of a header of this type is shown in U.S. Pat. No. 6,591,598 (Remillard) issued Jul. 15, 2003 to the present Assignees.

One problem which has arisen with the arrangement of the type described in this patent is that the tine tube bearings cannot tolerate the high speed of the pivotal movement of the tines necessary to meet the reel speed required for the higher ground speeds which can now be achieved by current headers.

SUMMARY OF THE INVENTION

It is one object of the present invention to provide an improved header.

According to the invention there is provided a crop harvesting header comprising:

a header frame structure arranged for movement in a direction of working movement across ground carrying a crop to be harvested;

a cutter bar arranged across a forward edge of the header frame structure for cutting the crop;

a cut crop transport arrangement mounted on the header frame structure for receiving and transporting the cut crop for further processing;

and a reel for controlling movement of the crop in the area over the cutter bar;

the reel being mounted on the header frame structure for movement with the header in the direction of movement;

a reel drive mechanism for driving rotation of the reel about a reel axis generally parallel to the cutter bar;

the reel having a plurality of reel bats at spaced positions around the reel axis;

each reel bat having a tine tube and a plurality of tines mounted on the tine tube and projecting generally radially outwardly from an axis of the tine tube parallel to the reel axis;

the tine tube comprising a peripheral wall surrounding a hollow interior;

each of the reel bats being pivotal about its respective axis so as to vary the angle of the tines about the bat axis as the reel rotates;

the reel including a plurality of tine tube support members arranged at radially spaced positions around the reel axis and at axially spaced positions along the reel axis so that each tine tube is supported at its radial position around the reel axis is supported at positions longitudinally spaced along the tine tube;

and a plurality of tine tube support bearings each connecting a respective one of the tine tube support members to a respective one of the tine tubes;

each of the tine tube support bearings comprising:

a cylindrical collar carried on the respective tine tube support member surrounding the bat axis and having an internal cylindrical bearing surface;

a cylindrical bearing member within the cylindrical collar and having an external cylindrical bearing surface in sliding bearing engagement with the internal bearing surface of the collar and an internal surface surrounding the tine tube;

the hollow tine tube at the bearing member having a transverse hole across the tube through the peripheral wall;

the peripheral wall having an indented recess at each end of the transverse hole;

the cylindrical bearing member having opposed projecting portions projecting inwardly from the internal surface thereof and each extending into a respective one of the indented recess;

and at least one fastener member extending into the hole and the projecting portions so as to hold the projecting portions in the indented recesses with outer ends of the fastener member being recessed from the external cylindrical bearing surface.

Preferably there is a single fastener member extending through the hole and into each projecting portion which has at each end a head portion each received within a respective recess in the external cylindrical bearing surface.

As an alternative, the fastener member can comprises separate components which act to secure each bushing half separately to each side of tine tube. In this case the fastener members can comprise pop rivets inserted into the holes and connecting the projecting portion to the tube. If the tine tube holes are threaded (tapped), the fastener member can comprise self-tapping screws or screws. That is the bushings do not necessarily need to be secured to the tine tube with the sex bolt/binder bolt arrangement as described in detail hereinafter.

In the preferred arrangement as described in detail hereinafter, the fastener member comprises a single threaded coupling for tightening the fastener member across the cylindrical bearing member at the projecting portions.

Preferably the fastener member has a shank at each end with an exterior diameter matching that of the holes.

Preferably the fastener member comprises first and second portions where the shank includes a male threaded section on the first portion and a female threaded sleeve on the second portion, commonly known as a "sex bolt".

Preferably the cylindrical bearing member has a shoulder at one end for butting against one end face of the cylindrical collar and a surrounding circlip at an opposed end for locating an opposed end of the cylindrical collar.

Preferably the cylindrical bearing member is formed on two sections divided longitudinally allowing the two second to be applied onto the tine tube from opposed sides.

BRIEF DESCRIPTION OF THE DRAWINGS

One embodiment of the invention will now be described in conjunction with the accompanying drawings in which.

DETAILED DESCRIPTION

Figure 1:
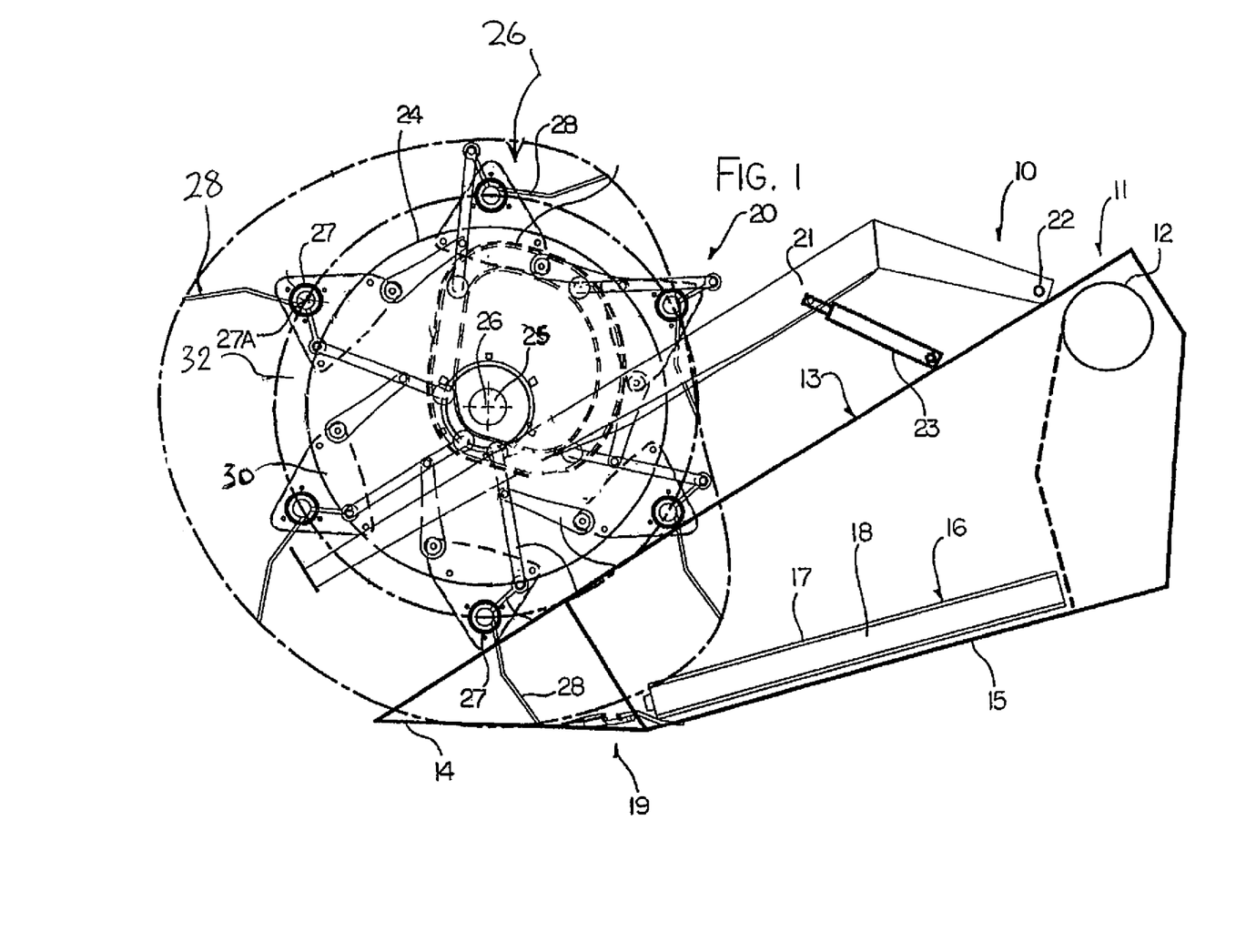
FIG. 1 is a side elevational view of a header according to the present invention.

In FIG. 1 is shown an embodiment of a header according to the present invention with a number of the elements being shown schematically since the general construction of such headers is well known to one skilled in the art. The header 10 includes a header frame 11 having a main frame tube 12 extending across the width of the header between two end frames one of which is shown at 13 and the other of which is of course at the other end and therefore not visible in the elevation of FIG. 1. The main tube 12 is suitably supported and attached on a propulsion vehicle in a manner so that the header frame can be moved forwardly across the ground in cutting a standing crop. The end frame 13 extends forwardly from the main tube 12 to a forward nose section 14. The main tube 12 carries a plurality of frame bars which extend downwardly and forwardly for supporting a table 15 of the header onto which crop material is deposited after cutting. The structural elements defining the frame bars on the table are not shown for convenience of illustration since again these are well known to one skilled in the art and can vary in accordance with engineering considerations.

On the table 15 is provided a crop conveyor 16 which is arranged to transport the crop after cutting across the width of a header to a discharge location. In the embodiment shown the conveyor is provided as a draper canvas 17 mounted on rollers 18. Other embodiments can use alternative crop transportation systems and primarily an auger which is commonly used as an alternative for the draper system. The embodiments of the present invention are not limited to either of the different types of header.

At the front of the table 15 is provided a cutter bar generally indicated at 19 which is again only shown schematically since the construction of this is well known to one skilled in the art. The cutter bar shown provides a sickle knife in guards which reciprocates back and forth in a cutting action on the standing crop so that the crop is deposited on the draper for transportation to the discharge location.

When used on a combine harvester the discharge location is associated with a crop transfer system which transfers the crop rearwardly into the feeder house of the combine. Headers of this type can of course also be used as a swather where the discharge location simply discharges the crop onto the ground in a swath or through a crop conditioner onto the ground.

The header further includes a reel generally indicated at 20. The reel 20 includes mounting arms 21 pivoted on a suitable mounting 22 adjacent the tube 12 so that the arms project forwardly from the frame to a position over the end frame elements 13 so as to provide support for the reel extending the header above the cutter bar. Each arm is movable in its pivotal action by a suitable drive actuator 23.

The number of arms can vary in accordance with engineering requirements depending upon the width of the header. Some headers have only arms at the ends and some have additional arms intermediate the ends to provide the necessary support.

The reel 20 thus is mounted by the arms on the header frame structure for movement with the header in the direction of movement. The reel includes a shaft 25 mounted for rotation about an axis 26 on the arms and driven by a rotary drive mechanism (not shown) for driving rotation of the reel about the reel axis which is generally parallel to the cutter bar.

The reel has a plurality of reel bats 26 at spaced positions around the reel axis 26 with each reel bat 26 having a tine tube 27 and a plurality of tines 28 mounted on the tine tube 27 and projecting generally radially outwardly from an axis 27A of the tine tube 27 parallel to the reel axis 26.

Each of the reel bats 26 is pivotal about its respective axis 27A so as to vary the angle of the tines or fingers about the bat axis as the reel rotates. A cam arrangement described in detail in the above patent of Remillard drives this movement at angular positions around the reel axis with the bats pivoting rapidly back and forth as the reel rotates.

Figure 2:
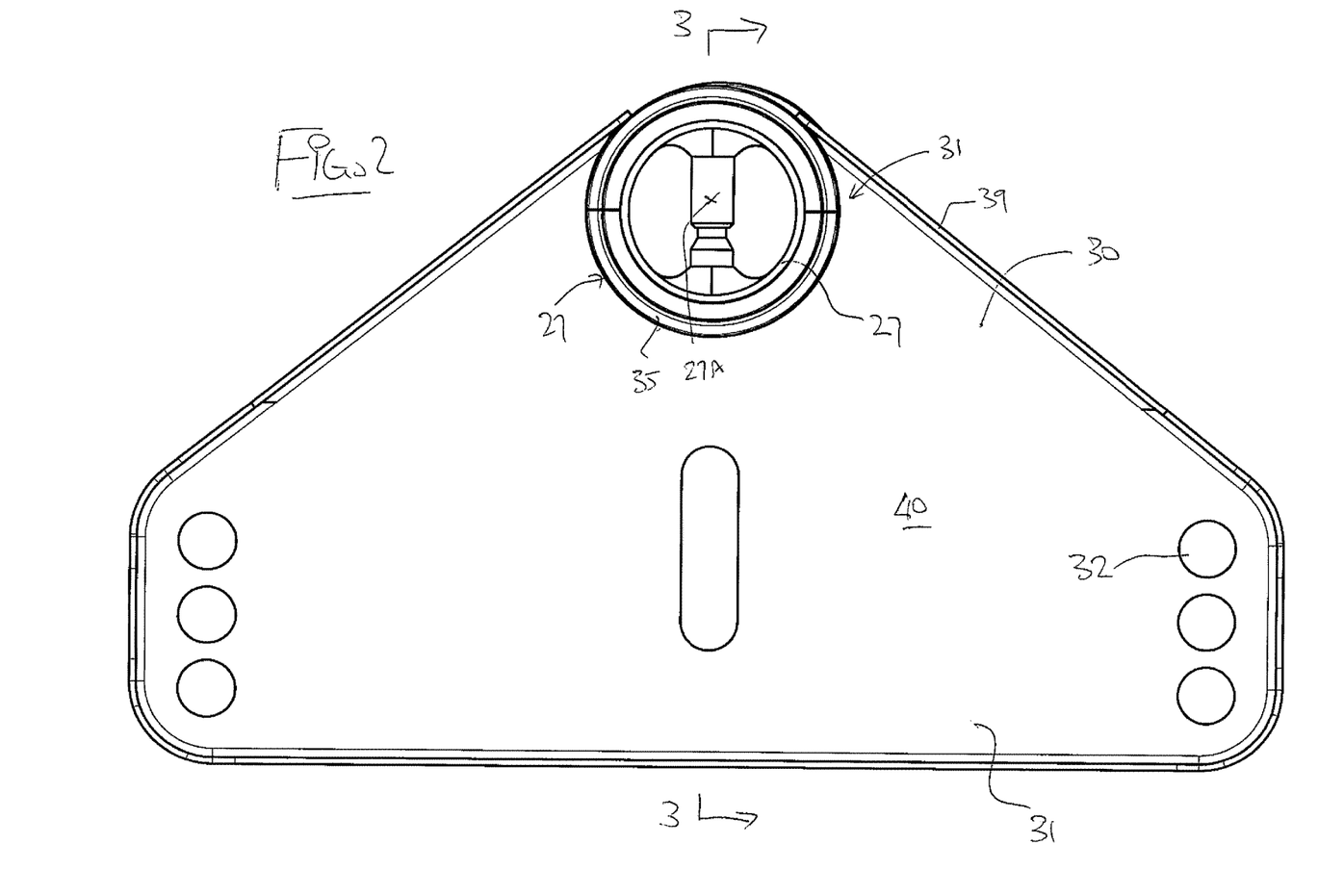
FIG. 2 is a front elevational view of one tine tube support member of the header of FIG. 1.

The reel including a plurality of tine tube support members 30 for supporting each tine tube. The support members 30 are generally triangular in shape with a base 31 mounted by holes 31 on a ring 32 carried on the shaft 25. Thus a suitable number of the rings 32 are carried on the shaft at spaced positions therealong with each ring having a number of the supports 30 where each tine tube is supported at its angular position around the shaft 25 by its respective support.

At the outer apex of each triangular support is provided a tine tube bearing 31. Thus the tine tubes are arranged at radially spaced positions around the reel axis by the supports 30 on the rings 32 and at axially spaced positions along the reel axis by the axial spacing of the rings 32 so that each tine tube is supported at its radial position around the reel axis and is supported at positions longitudinally spaced along the tine tube.

Figure 3:
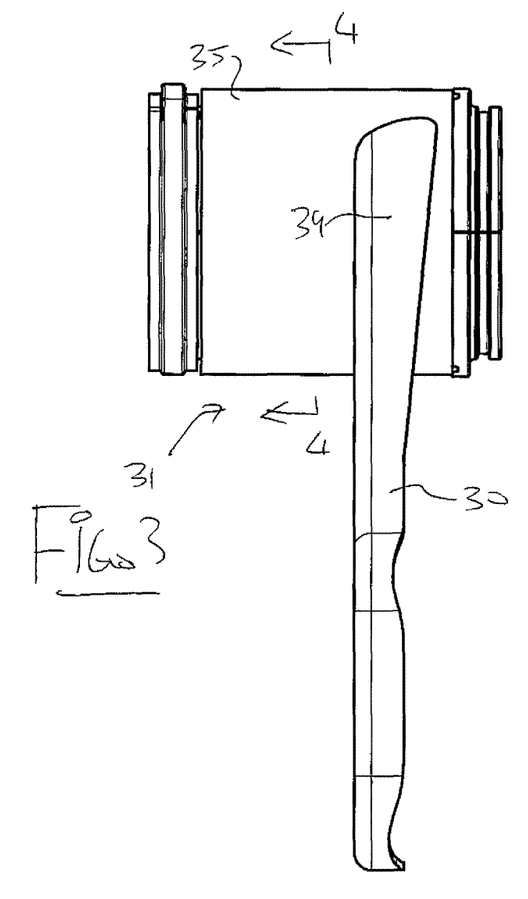
FIG. 3 is a cross-sectional view along the lines 3-3 of FIG. 2.

Each tine tube comprises a metal tube defining a peripheral wall 33 surrounding a hollow interior 34. The tines 28 are suitably mounted on the tube for pivotal movement therewith around the bat axis 27A.

The tine tube is thus supported on the plurality of tine tube support bearings 31 each connecting a respective one of the tine tube support members 30 to a respective one of the tine tubes 27.

Each of the tine tube support bearings comprises a cylindrical collar 35 and a cylindrical bearing member 38 inside the collar 35.

The collar 35 is carried on the respective tine tube support member 30 as a ring fastened into the flat plate body of the support 30 with a peripheral flange 39 of the support partly surrounding the collar 35 to hold the collar with its axis at right angles to the plate 40 of the support 31.

The collar 35 thus surrounds the bat axis 27A and has an internal cylindrical bearing surface 41.

The bearing 31 further comprises a cylindrical bearing member 38 mounted within the cylindrical collar 35 and having an external cylindrical bearing surface 43 in sliding bearing engagement with the internal bearing surface 41 of the collar 35 and an internal surface 44 surrounding the outer surface of the wall 33 of the tine tube 27.

Figure 4:
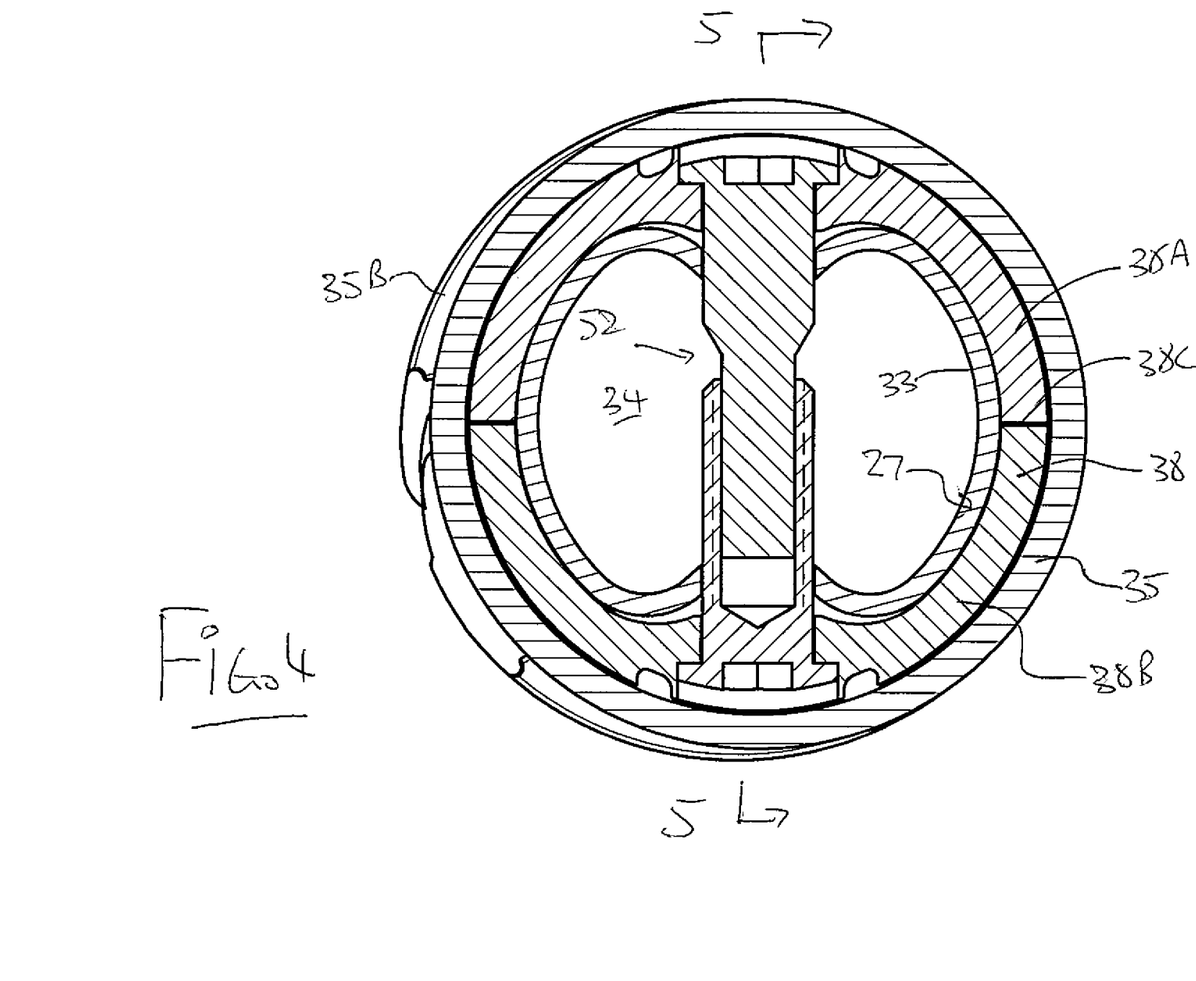
FIG. 4 is a cross-sectional view along the lines 4-4 of FIG. 3.

The hollow tine tube 27 at the bearing member 31 has a transverse hole 45, 46 drilled across the tube 27 through the peripheral wall 33 forming two opposed holes 45 and 46 in the wall. The peripheral wall 33 at the two opposed holes is punched to form two indented recesses 47, 48, one at each end of the transverse holes 45, 46. The holes and indents are typically formed by initially punching a conical indent in opposed sides of the wall 333 and then by drilling through the wall at the indent. This forms a curved wall section converging inwardly of the cylindrical outer wall part to the base of the indent where the respective hole is located.

In order to match the indented holes, the cylindrical bearing member is molded from a plastics material to form opposed projecting portions projecting inwardly from the internal surface 44 thereof and each extending into a respective one of the indented recesses 47, 48. The projecting portions are curved to match the curvature created by the punching action on the wall 33.

A fastener member 52 extends through the hole defined by the opposed holes 45, 46 in the wall 33 and the into the projecting portions 49, 50 so as to hold the projecting portions pulled into the indented recesses 48, 49. Thus the projecting portions are formed with holes 54, 55 matching the holes 45, 46 through which the fastener 52 can pass.

The fastener 52 comprises a shank passing through the holes and end caps 56, 57 at outer ends of the fastener member. The end caps or head portions 56, 57 of the fastener are received in counter bores 58, 59 recessed from the external cylindrical bearing surface 43 of the bearing member 38.

Thus the fastener member 52 has at each end a head portion or cap 56, 57 each received within a respective recess 58, 59 in the external cylindrical bearing surface so that the end cap is spaced radially inwardly within the surface 43.

The fastener member 52 comprises a threaded coupling 59 for tightening the fastener member across the cylindrical bearing member at the projecting portions to pull the projecting portions into the recesses 48 49 to hold the bearing member 38 tightly onto the outer surface of the tine tube and so as to transfer forces between the bearing member 38 and the tine tube.

The fastener member is of the type commonly known as a sex bolt so that the fastener member 52 has a shank 61, 62 at each end with an exterior diameter matching that of the holes 45, 46. The sex bolt 52 forming the fastener member comprises first and second portions where the shank 62 includes a male threaded section 64 and the shank 61 a female threaded sleeve 65.

Figure 5:
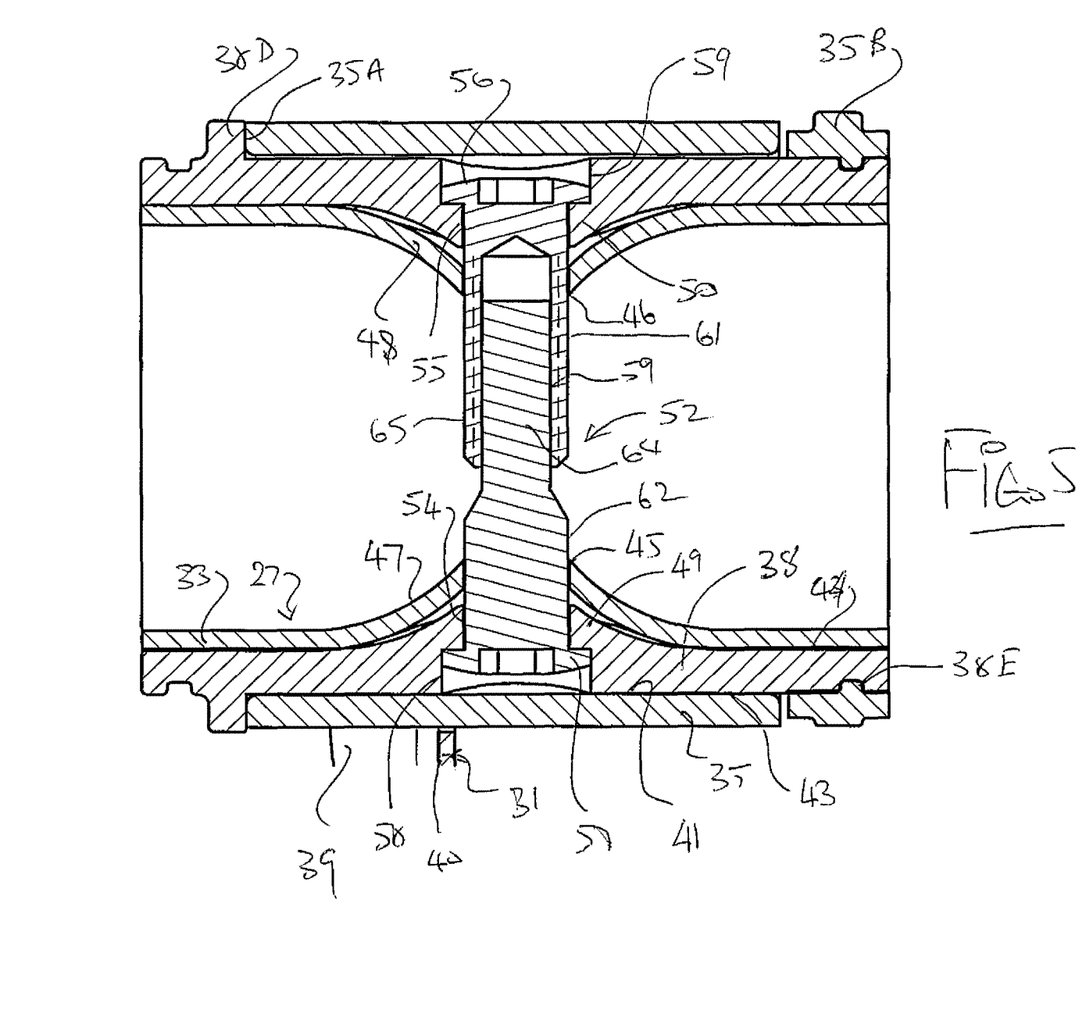
FIG. 5 is a cross-sectional view along the lines 5-5 of FIG. 4.

The cylindrical bearing member 38 is formed in two sections 38A, 38B divided longitudinally to form two symmetrical halves divided at diametrically opposed dividing lines 38C allowing the two sections to be applied onto the tine tube from opposed sides following which the collar 35 slides into place over the surface 43 to hold the two sections in place. The location of the collar 35 on the member 38 is determined by a shoulder 38D at one end of the member 38 for butting against one end face 35A of the cylindrical collar and by a surrounding circlip 35B received into a channel 38E at an opposed end of the member 38 for locating an opposed end of the cylindrical collar 35. This cooperation provides a bearing allowing the pivotal movement of the tine tube around its axis while holding the tine tube against longitudinal movement relative to the structure of the reel.

This effective support of the bearings allows the member 38 to be formed of a more resistant plastics material which can in many cases be more brittle or weaker so that the coupling provided by the arrangement defined above overcomes these difficulties.

The invention claimed is:

1. A crop harvesting header comprising:
   a header frame structure arranged for movement in a direction of working movement across ground carrying a crop to be harvested;
   a cutter bar arranged across a forward edge of the header frame structure for cutting the crop;
   a cut crop transport arrangement mounted on the header frame structure for receiving and transporting the cut crop for further processing;
   and a reel for controlling movement of the crop in the area over the cutter bar;
   the reel being mounted on the header frame structure for movement with the header in the direction of movement;
   a reel drive mechanism for driving rotation of the reel about a reel axis generally parallel to the cutter bar;
   the reel having a plurality of reel bats at spaced positions around the reel axis;
   each reel bat having a tine tube and a plurality of tines mounted on the tine tube, the tines projecting generally radially outwardly from an axis of the tine tube which axis is parallel to the reel axis;
   the tine tube comprising a peripheral wall surrounding a hollow interior;
   each of the reel bats being pivotal about its respective axis so as to vary the angle of the tines about the bat axis as the reel rotates;
   the reel including a plurality of tine tube support members arranged at radially spaced positions around the reel axis and at axially spaced positions along the reel axis so that each tine tube is supported at its radial position around the reel axis at positions longitudinally spaced along the tine tube;
   and a plurality of tine tube support bearings each connecting a respective one of the tine tube support members to a respective one of the tine tubes;
   each of the tine tube support bearings comprising:
      a cylindrical collar carried on the respective tine tube support member surrounding the bat axis and having an internal cylindrical bearing surface;
      a cylindrical bearing member within the cylindrical collar and having an external cylindrical bearing surface in sliding bearing engagement with the internal bearing surface of the collar and an internal surface surrounding the tine tube;
      the hollow tine tube at the bearing member having a transverse hole across the tube through the peripheral wall;
      the peripheral wall having opposed indented recesses each at a respective end of the transverse hole;
      the cylindrical bearing member having opposed projecting portions projecting inwardly from the internal surface thereof and each extending into a respective one of the indented recesses;
      and at least one fastener member extending into the hole and the projecting portions so as to hold the projecting portions in the indented recesses;
      said fastener member being axially aligned with the internal cylindrical bearing surface of the cylindrical collar;
      outer ends of said at least one fastener member being recessed from the external cylindrical bearing surface of the cylindrical bearing member.

2. The crop harvesting header according to claim 1 wherein said at least one fastener member has at each end a head portion each received within a respective recess in the external cylindrical bearing surface.

3. The crop harvesting header according to claim 1 wherein said at least one fastener member comprises a single fastening member defined by a threaded coupling for tightening the fastener member across the cylindrical bearing member at the projecting portions.

4. The crop harvesting header according to claim 1 wherein said at least one fastener member has a shank at each end with an exterior diameter matching that of the holes.

5. The crop harvesting header according to claim 4 wherein said at least one fastener member comprises first and second portions where the shank includes a male threaded section on the first portion and a female threaded sleeve on the second portion.

6. The crop harvesting header according to claim 1 wherein the cylindrical bearing member has a shoulder at one end for butting against one end face of the cylindrical collar and there is provided a surrounding circlip at an opposed end of the cylindrical bearing member for locating an opposed end of the cylindrical collar in position relative to the cylindrical bearing member.

7. The crop harvesting header according to claim 1 wherein the cylindrical bearing member is formed in two sections divided longitudinally allowing the two sections to be applied onto the tine tube from opposed sides.

8. A crop harvesting header comprising:
  a header frame structure arranged for movement in a direction of working movement across ground carrying a crop to be harvested;
  a cutter bar arranged across a forward edge of the header frame structure for cutting the crop;
  a cut crop transport arrangement mounted on the header frame structure for receiving and transporting the cut crop for further processing;
  and a reel for controlling movement of the crop in the area over the cutter bar;
  the reel being mounted on the header frame structure for movement with the header in the direction of movement;
  a reel drive mechanism for driving rotation of the reel about a reel axis generally parallel to the cutter bar;
  the reel having a plurality of reel bats at spaced positions around the reel axis;
  each reel bat having a tine tube and a plurality of tines mounted on the tine tube, the tines projecting generally radially outwardly from an axis of the tine tube which axis is parallel to the reel axis;
  the tine tube comprising a peripheral wall surrounding a hollow interior;
  each of the reel bats being pivotal about its respective axis so as to vary the angle of the tines about the bat axis as the reel rotates;
  the reel including a plurality of tine tube support members arranged at radially spaced positions around the reel axis and at axially spaced positions along the reel axis so that each tine tube is supported at its radial position around the reel axis at positions longitudinally spaced along the tine tube;
  and a plurality of tine tube support bearings each connecting a respective one of the tine tube support members to a respective one of the tine tubes;
  each of the tine tube support bearings comprising:
    a cylindrical collar carried on the respective tine tube support member surrounding the bat axis and having an internal cylindrical bearing surface;
    a cylindrical bearing member within the cylindrical collar and having an external cylindrical bearing surface in sliding bearing engagement with the internal bearing surface of the collar and an internal surface surrounding the tine tube;
    the hollow tine tube at the bearing member having a transverse hole across the tube through the peripheral wall;
    the peripheral wall having opposed indented recesses each at a respective end of the transverse hole;
    the cylindrical bearing member having opposed projecting portions projecting inwardly from the internal surface thereof and each extending into a respective one of the indented recesses;
    and at least one fastener member extending into the hole and the projecting portions so as to hold the projecting portions in the indented recesses with outer ends of said at least one fastener member being recessed from the external cylindrical bearing surface of the cylindrical bearing member;
  wherein the cylindrical bearing member has a shoulder at one end for butting against one end face of the cylindrical collar;
  and wherein there is provided a surrounding circlip at an opposed end of the cylindrical bearing member for locating an opposed end of the cylindrical collar in position relative to the cylindrical bearing member.

9. The crop harvesting header according to claim 8 wherein said at least one fastener member has at each end a head portion each received within a respective recess in the external cylindrical bearing surface.

10. The crop harvesting header according to claim 8 wherein said at least one fastener member comprises a single fastening member defined by a threaded coupling for tightening the fastener member across the cylindrical bearing member at the projecting portions.

11. The crop harvesting header according to claim 8 wherein said at least one fastener member has a shank at each end with an exterior diameter matching that of the holes.

12. The crop harvesting header according to claim 11 wherein said at least one fastener member comprises first and second portions where the shank includes a male threaded section on the first portion and a female threaded sleeve on the second portion.

13. The crop harvesting header according to claim 11 wherein the cylindrical bearing member is formed in two sections divided longitudinally allowing the two sections to be applied onto the tine tube from opposed sides.

* * * * *